(No Model.)
H. S. CHASE.
WASTE PIPE PLUG.
No. 506,872. Patented Oct. 17, 1893.
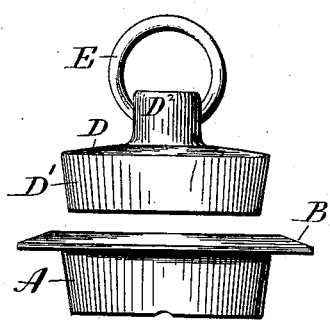
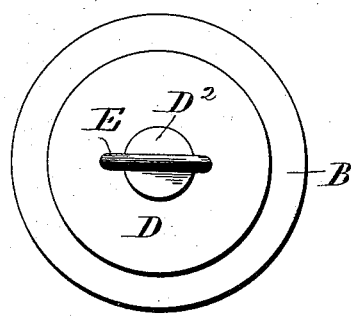
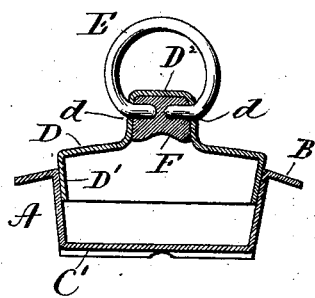
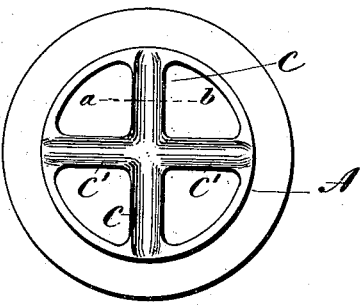
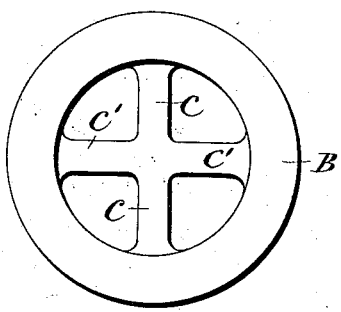

UNITED STATES PATENT OFFICE.

HENRY S. CHASE, OF WATERBURY, CONNECTICUT, ASSIGNOR TO THE WATERBURY MANUFACTURING COMPANY, OF SAME PLACE.

WASTE-PIPE PLUG.

SPECIFICATION forming part of Letters Patent No. 506,872, dated October 17, 1893.

Application filed June 12, 1893. Serial No. 477,328. (No model.)

*To all whom it may concern:*

Be it known that I, HENRY S. CHASE, of Waterbury, in the county of New Haven and State of Connecticut, have invented a new Improvement in Waste-Pipe Plugs; and I do hereby declare the following, when taken in connection with accompanying drawings and the letters of reference marked thereon, to be a full, clear, and exact description of the same, and which said drawings constitute part of this specification, and represent, in—

Figure 1, a view in side elevation of a strainer and plug constructed in accordance with my invention, the plug being shown as lifted above the strainer; Fig. 2, a plan view of the strainer and plug, with the latter in position in the former; Fig. 3, a detached plan view of the strainer; Fig. 4, a reverse plan view thereof; Fig. 5, a view of the strainer and plug in vertical central section; Fig. 6, a view in transverse section on the line $a$—$b$ of Fig. 4 through one of the concavo-convex bars of the grill of the strainer.

My invention relates to an improved waste-pipe strainer and plug, for use in wash-trays, basins, bath-tubs, and in kindred situations, the object being to produce, at a low cost for manufacture, an article of superior effectiveness and appearance.

With these ends in view, my invention consists in a strainer made of a single piece of sheet-metal, and comprising a tapering, circular body, an annular flange offsetting from the upper edge thereof, and a grill composed of concavo-convex bars located within the body at the lower edge thereof.

Heretofore strainers and plugs for waste-pipes have generally been made of cast-metal, and required expensive fitting and finishing in order to prepare them for use, for unless carefully fitted, a good joint could not be obtained between the plug and the strainer, and unless finished, the articles would not present a good appearance.

In carrying out my invention, I strike up the strainer from a single piece of sheet-metal, so that it requires no fitting in order to prepare it for use, and if finished at all, the expense thereof is very small. It comprises a tapering circular body A, an annular flange B, extending outwardly from the upper edge thereof, and a grill constituting the strainer proper, located within the body at the lower edge thereof, and composed, as shown, of two bars C C', intersecting each other at a right angle, and struck up into concavo-convex form from their under sides, so as to stiffen them, and to adapt them to better shed water, and other small objects which may be thrown upon them the convex sides of the said bars being presented upward.

The plug as herein shown, consists of a body D, having a tapering annular flange D', adapted to fit snugly within the body A of the strainer, and a central outwardly projecting hollow stem $D^2$, having perforations $d$ $d$ formed at opposite points in it to receive the ends of a ring E, which, by preference, is additionally secured in place by a bearing F, of lead, or equivalent material, which is run into the inside of the stem after the ring has been applied thereto. The lead thus applied affords a bearing for the ends of the ring and stiffens the plug. As shown, the body, flange and stem of the plug are struck up from a single piece of sheet-metal. When thus formed, no fitting is required to adapt the plug for use, and if the plug is finished at all, it is done at small expense. Of course the particular form and pattern of the grill of the strainer may be changed. I would therefore have it understood that I do not limit myself to the particular construction herein shown and described, but hold myself at liberty to make such changes and alterations as fairly fall within the spirit and scope of my invention.

I am aware that a waste-pipe strainer made of a single piece of sheet-metal comprising a tapering circular body, an annular flange offsetting from the upper edge thereof, and having its lower end adapted to act as a strainer, is old, and I do not therefore claim that construction broadly.

I am also aware that a strainer having a grill comprising solid convex bars having their convex surfaces uppermost is old, and I do not claim that construction broadly.

Having fully described my invention, what I claim as new, and desire to secure by Letters Patent, is—

The herein described waste-pipe strainer, made from a single piece of sheet-metal, and comprising a tapering, circular body, a flange offsetting from the upper edge thereof, and a grill located within the body at the lower edge thereof, and composed of concavo-convex bars arranged with their convex faces upward, substantially as described.

In testimony whereof I have signed this specification in the presence of two subscribing witnesses.

HENRY S. CHASE.

Witnesses:
JOHN S. NEAGLE,
HOWARD T. PARKER.